(12) United States Patent
Nunokawa et al.

(10) Patent No.: US 7,161,700 B2
(45) Date of Patent: Jan. 9, 2007

(54) PRINT DATA PROVIDING SERVICE THROUGH NETWORK

(75) Inventors: Hirokazu Nunokawa, Nagano-ken (JP); Koichi Otsuki, Nangano-ken (JP)

(73) Assignee: Seiko Epson Corporation, Tokyo (JP)

( * ) Notice: Subject to any disclaimer, the term of this patent is extended or adjusted under 35 U.S.C. 154(b) by 947 days.

(21) Appl. No.: 10/173,980

(22) Filed: Jun. 19, 2002

(65) Prior Publication Data

US 2003/0011814 A1 Jan. 16, 2003

(30) Foreign Application Priority Data

Jun. 21, 2001 (JP) .............................. 2001-187761

(51) Int. Cl.
*G06F 15/00* (2006.01)
(52) U.S. Cl. ..................................... 358/1.15; 709/224
(58) Field of Classification Search ............... 358/1.15, 358/523; 709/217, 224; 710/16–17; 400/76; 382/305–306; 707/200, 204

See application file for complete search history.

(56) References Cited

U.S. PATENT DOCUMENTS 5,533,174 A * 7/1996 Flowers et al. ............ 358/1.15
6,658,167 B1 * 12/2003 Lee et al. .................. 382/305

FOREIGN PATENT DOCUMENTS

JP 5-48884 2/1993
WO WO 98/52762 11/1998

\* cited by examiner

*Primary Examiner*—Matthew C. Bella
*Assistant Examiner*—Saeid Ebrahmi-Dehkordy
(74) *Attorney, Agent, or Firm*—Sughrue Mion, PLLC

(57) ABSTRACT

When there is a request for provision of print data from a client 200, server 120 requests client 200 for printer characteristics information representing print characteristics of a printer 210. When client 200 transmits printer characteristics information to server 120, server 120 sets a print data generating process condition in accordance with the printer characteristics information. A server 120 then generates, in accordance with the set print data generating process condition, print data for use by printer 210, and transmits it to client 200. Client 200 transfers the print data provided from server 120 as-is to printer 210 and causes it to execute printing.

9 Claims, 8 Drawing Sheets

Fig.7(A)

HALFTONE DATA (before rasterization)

| Raster line number | Pixel location 1-8 (Halftone data) | Dot recording nozzle |
|---|---|---|
| L1 | ●■●■●■●■ | ○,●:#4  □,■:#1 |
| L2 | ●■●■●■●■ | ○,●:#5  □,■:#2 |
| L3 | ○□○■●□○□ | ○,●:#6  □,■:#3 |
| L4 | ○□○■●□○□ | ○,●:#4  □,■:#1 |
| L5 | ○□○■●□○□ | ○,●:#5  □,■:#2 |
| L6 | ○□○■●□○□ | ○,●:#6  □,■:#3 |

Fig.7(B)

RASTER DATA

Pass 1

| Nozzle No. | Line No. | 1 | 2 | 3 | 4 | 5 | 6 | 7 | 8 |
|---|---|---|---|---|---|---|---|---|---|
| #1 | – | – | – | – | – | – | – | – | – |
| #2 | – | – | – | – | – | – | – | – | – |
| #3 | – | – | – | – | – | – | – | – | – |
| #4 | – | – | – | – | – | – | – | – | – |
| #5 | – | – | – | – | – | – | – | – | – |
| #6 | L3 | ○ | – | ○ | – | ● | – | ○ | – |

Pass 2

| Nozzle No. | Line No. | 1 | 2 | 3 | 4 | 5 | 6 | 7 | 8 |
|---|---|---|---|---|---|---|---|---|---|
| #1 | – | – | – | – | – | – | – | – | – |
| #2 | – | – | – | – | – | – | – | – | – |
| #3 | – | – | – | – | – | – | – | – | – |
| #4 | – | – | – | – | – | – | – | – | – |
| #5 | L2 | ● | – | ● | – | ● | – | ● | – |
| #6 | L6 | ○ | – | ○ | – | ● | – | ○ | – |

Pass 3

| Nozzle No. | Line No. | 1 | 2 | 3 | 4 | 5 | 6 | 7 | 8 |
|---|---|---|---|---|---|---|---|---|---|
| #1 | – | – | – | – | – | – | – | – | – |
| #2 | – | – | – | – | – | – | – | – | – |
| #3 | – | – | – | – | – | – | – | – | – |
| #4 | L1 | ● | – | ● | – | ● | – | ● | – |
| #5 | L5 | ○ | – | ○ | – | ● | – | ○ | – |
| #6 | L9 | ○ | – | ○ | – | ● | – | ○ | – |

Pass 4

| Nozzle No. | Line No. | 1 | 2 | 3 | 4 | 5 | 6 | 7 | 8 |
|---|---|---|---|---|---|---|---|---|---|
| #1 | – | – | – | – | – | – | – | – | – |
| #2 | – | – | – | – | – | – | – | – | – |
| #3 | – | – | – | – | – | – | – | – | – |
| #4 | L4 | ○ | – | ○ | – | ● | – | ○ | – |
| #5 | L8 | ○ | – | ○ | – | ○ | – | ○ | – |
| #6 | L12 | ○ | – | ○ | – | ○ | – | ○ | – |

Pass 5

| Nozzle No. | Line No. | 1 | 2 | 3 | 4 | 5 | 6 | 7 | 8 |
|---|---|---|---|---|---|---|---|---|---|
| #1 | – | – | – | – | – | – | – | – | – |
| #2 | – | – | – | – | – | – | – | – | – |
| #3 | L3 | – | □ | – | ■ | – | □ | – | □ |
| #4 | L7 | – | □ | – | □ | – | □ | – | □ |
| #5 | L11 | – | □ | – | □ | – | □ | – | □ |
| #6 | L15 | – | □ | – | □ | – | □ | – | □ |

Pass 6

| Nozzle No. | Line No. | 1 | 2 | 3 | 4 | 5 | 6 | 7 | 8 |
|---|---|---|---|---|---|---|---|---|---|
| #1 | – | – | – | – | – | – | – | – | – |
| #2 | L2 | – | ■ | – | ■ | – | ■ | – | ■ |
| #3 | L6 | – | □ | – | ■ | – | □ | – | □ |
| #4 | L10 | – | □ | – | □ | – | □ | – | □ |
| #5 | L14 | – | □ | – | □ | – | □ | – | □ |
| #6 | L18 | – | □ | – | □ | – | □ | – | □ |

Pass 7

| Nozzle No. | Line No. | 1 | 2 | 3 | 4 | 5 | 6 | 7 | 8 |
|---|---|---|---|---|---|---|---|---|---|
| #1 | L1 | – | ■ | – | ■ | – | ■ | – | ■ |
| #2 | L5 | – | □ | – | ■ | – | □ | – | □ |
| #3 | L9 | – | □ | – | □ | – | □ | – | □ |
| #4 | L13 | – | □ | – | □ | – | □ | – | □ |
| #5 | L17 | – | □ | – | □ | – | □ | – | □ |
| #6 | L21 | – | □ | – | □ | – | □ | – | □ |

Pass 8

| Nozzle No. | Line No. | 1 | 2 | 3 | 4 | 5 | 6 | 7 | 8 |
|---|---|---|---|---|---|---|---|---|---|
| #1 | L4 | – | □ | – | ■ | – | □ | – | □ |
| #2 | L8 | – | □ | – | □ | – | □ | – | □ |
| #3 | L12 | – | □ | – | □ | – | □ | – | □ |
| #4 | L16 | – | □ | – | □ | – | □ | – | □ |
| #5 | L20 | – | □ | – | □ | – | □ | – | □ |
| #6 | L24 | – | □ | – | □ | – | □ | – | □ |

PRINT DATA PROVIDING SERVICE THROUGH NETWORK

BACKGROUND OF THE INVENTION

1. Field of the Invention

This invention relates to a technique for providing print data through a network such as the Internet.

2. Description of the Related Art

When a printer is used as an output device of a personal computer, it is typical for the printer to execute printing according to print data provided from the personal computer. At this time, the personal computer generates CMYK color system print data from RGB color system or YCbCr color system multiple tone image data.

In recent years, a service that provides print data through the Internet is utilizable. With this service, print data of a format that can be directly provided to a personal computer printer is provided from a server to a client, and the client, by transferring the provided print data as-is to the printer, can print an image. In service of this kind, the reason that print data of a format directly transferable to a printer is provided from server to client is in order to prevent the occurrence of a problem of copyright infringement. That is, assume that data provided through a network is RGB multiple tone image data; in this case if image data is stored on the client side, there is a possibility of a problem of copyright infringement occurring due to reproduction thereof On the other hand, as stated, in the case of providing print data of a format directly transferable to a printer, there is no such concern.

However, actual print characteristics differ subtly from one another by individual printers. Because of this, even if printing is executed using the same print data, in reproduced printed matter slight differences will occur in each individual printer. Therefore, depending on printer print characteristics, even if print data supplied from a server is used, there is a possibility that printed matter of sufficient picture quality is not obtained.

SUMMARY OF THE INVENTION

Accordingly, an object of the present invention is to provide a technique that provides individual printer-adapted print data through a network.

To solve the above problem, there is provided a method of providing through a network from a server system to a client device, print data for performing printing to a specific printer connected to the client device. The server system stores a web page containing a print data request-use element for inputting a request of print data used for reproducing a print target image. The client device, when a print data request-use element has been selected by the user of the client device on a web page, transmits from the client device to the server system a request to provide print data used for reproducing a print target image. The server system, in response to the request to provide print data, transmits to the client device a request for printer characteristics information representing print characteristic of a specific printer connected to the client device. In response to this request of printer characteristic information, the client device transmits printer characteristic information to the server system. The server system, in accordance with this printer characteristic information, sets a print data generation process condition to generate print data. Then, the server system, in accordance with the print data generation process condition, generates print data for specific printer use, and provides from the server system to the client device print data for specific printer use. The client device, by means of transfer to the specific printer of print data provided from the server system, executes printing of the print target image by the specific printer.

With this system, print data is created according to a print data generation process condition set in response to printer characteristic information supplied from a client device to a server system, and so print data suited to specific printer connected to a client device can be provided.

The present invention can be implemented in various modes, for example, a method of providing print data and a network system therefor, a server system or client device therefor, a computer program for implementing the method, system or device functions, a recording medium recording that computer program, a data signal containing that computer program and embodied in a carrier wave, and other modes.

These and other objects, features, modes and advantages of the present invention will likely become apparent from the following description of the preferred embodiments shown hereinbelow together with drawings.

BRIEF DESCRIPTION OF THE DRAWINGS

FIG. 7(A) and FIG. 7(B) are illustrations showing the contents of a rasterizing process.

DESCRIPTION OF THE PREFERRED EMBODIMENTS

The mode of working of the invention is described based on embodiments in the order hereinbelow.

A. System Configuration
B. Processing Procedure of Embodiment
C Print Mode and Rasterizing Process
D. Modification Examples

A. System Configuration

Figure 1:
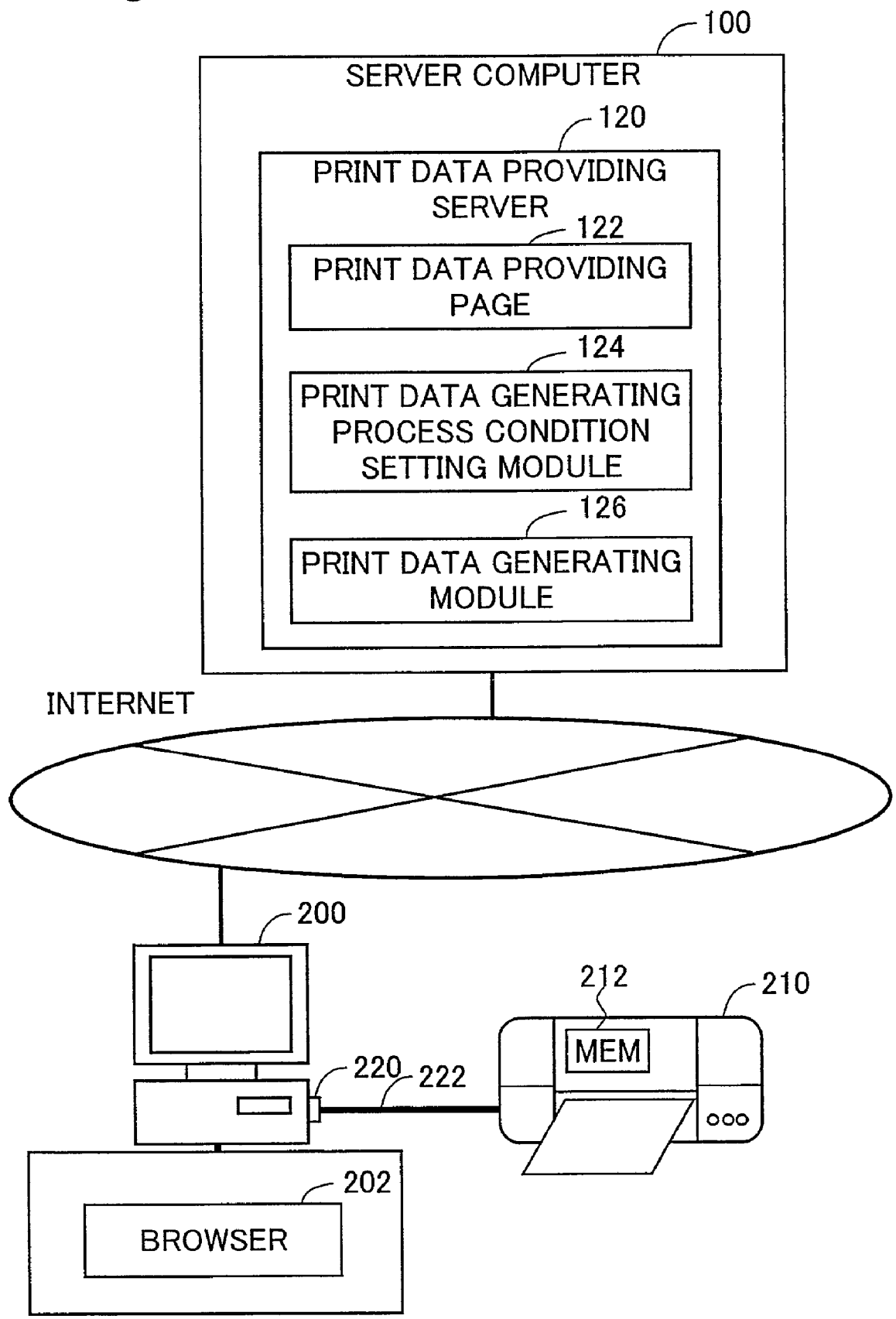
FIG. 1 is an illustration showing an entire configuration of a print data providing service system as one embodiment of the present invention.

FIG. 1 is an illustration showing an entire configuration of a print data providing service system as one embodiment of the present invention. This system is composed of a server computer 100 and a client computer 200 connected through the Internet.

To client computer 200, there is connected via a parallel port 220 and a cable 222 a printer 210. On client computer 200, a browser 202 is operable.

On server computer 100, a print data providing server 120 is running. Print data providing server 120 is a server program utilized in order to execute provision of print data to client computer 200. Print data providing server 120 includes as a web page a data file of a print data providing service page 122, and also includes, as programs to create print data and transfer to client computer 200, a print data generation process condition setting module 124, and a print data generating module 126.

Figure 2:
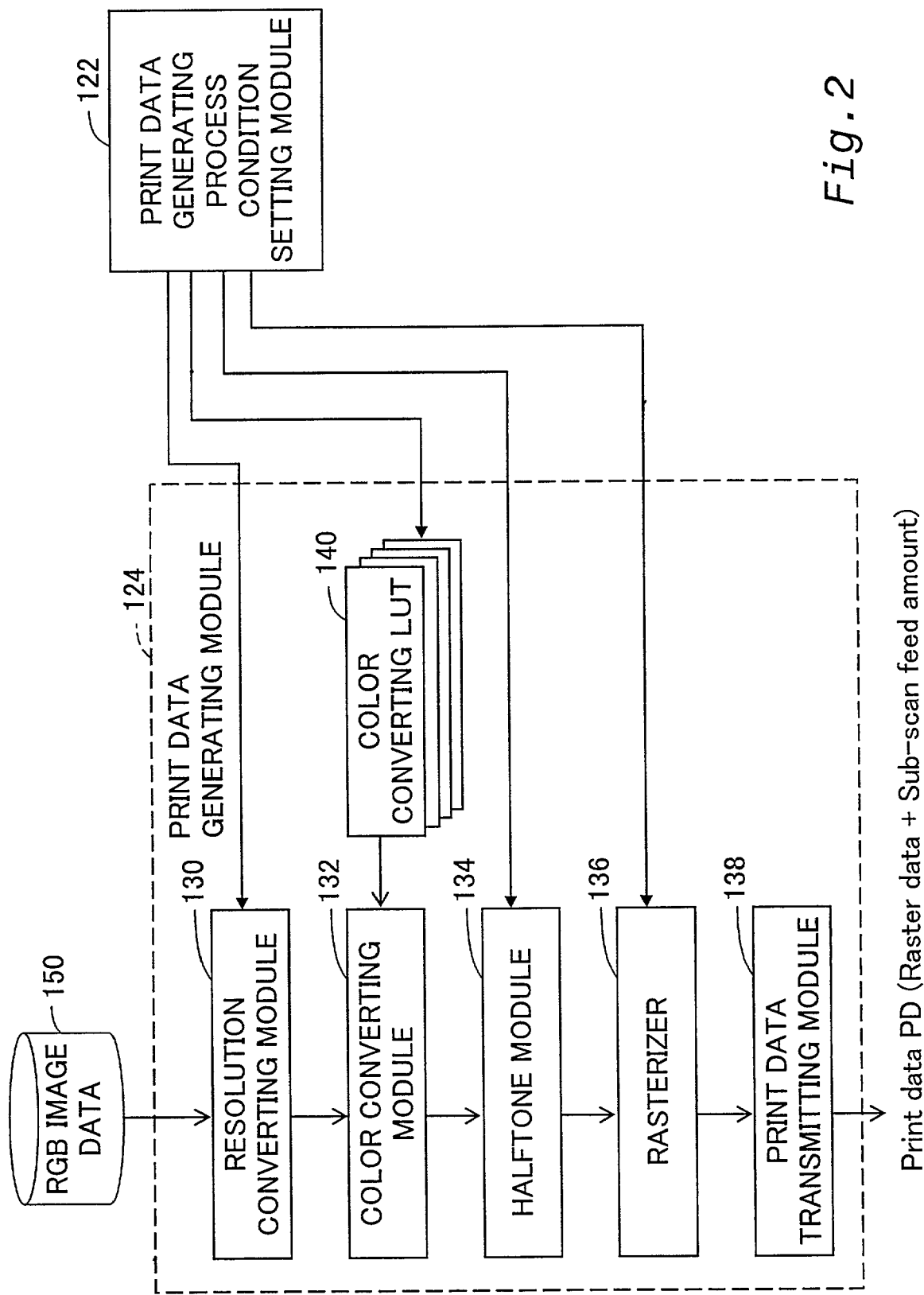
FIG. 2 is a block diagram showing an internal configuration of a print data generating module 126.

FIG. 2 is a block diagram showing an internal configuration of print data generating module 126. Print data generating module 126 includes a resolution converting module 130, a color converting module 132, a halftone module 134, a rasterizer 136, a print data transmitting module 138, and a color conversion look-up table 140.

Resolution converting module 130 reads RGB multiple tone image data stored in hard disk 150 of server computer 100, and converts the resolution of this image data to the print resolution of printer 210. Note, however, that in the event that resolution of RGB image data is the same as print resolution of printer 210, this process is omitted. Color converting module 132, using color conversion look-up table 140, for each pixel, converts RGB image data to multiple tone data of a plurality of ink colors that printer 210 can utilize.

Multiple tone data converted thusly has, for example tone values of 256 levels. Halftone module 134 executes a so-called halftone process to generate halftone data. Halftone data is data indicating a dot formation condition in each pixel in a print target image. This halftone data is sorted in the data order that ought to be transferred to printer 210 by rasterizer 136, and transmitted as final print data PD to print data transmitting module 138. Print data PD includes raster data indicating formation condition of dots formed during each main scan in printing, and data indicating sub-scan amounts. The details of the process contents of rasterizer 136 are further described later.

B. Operation of Embodiment

Figure 3:
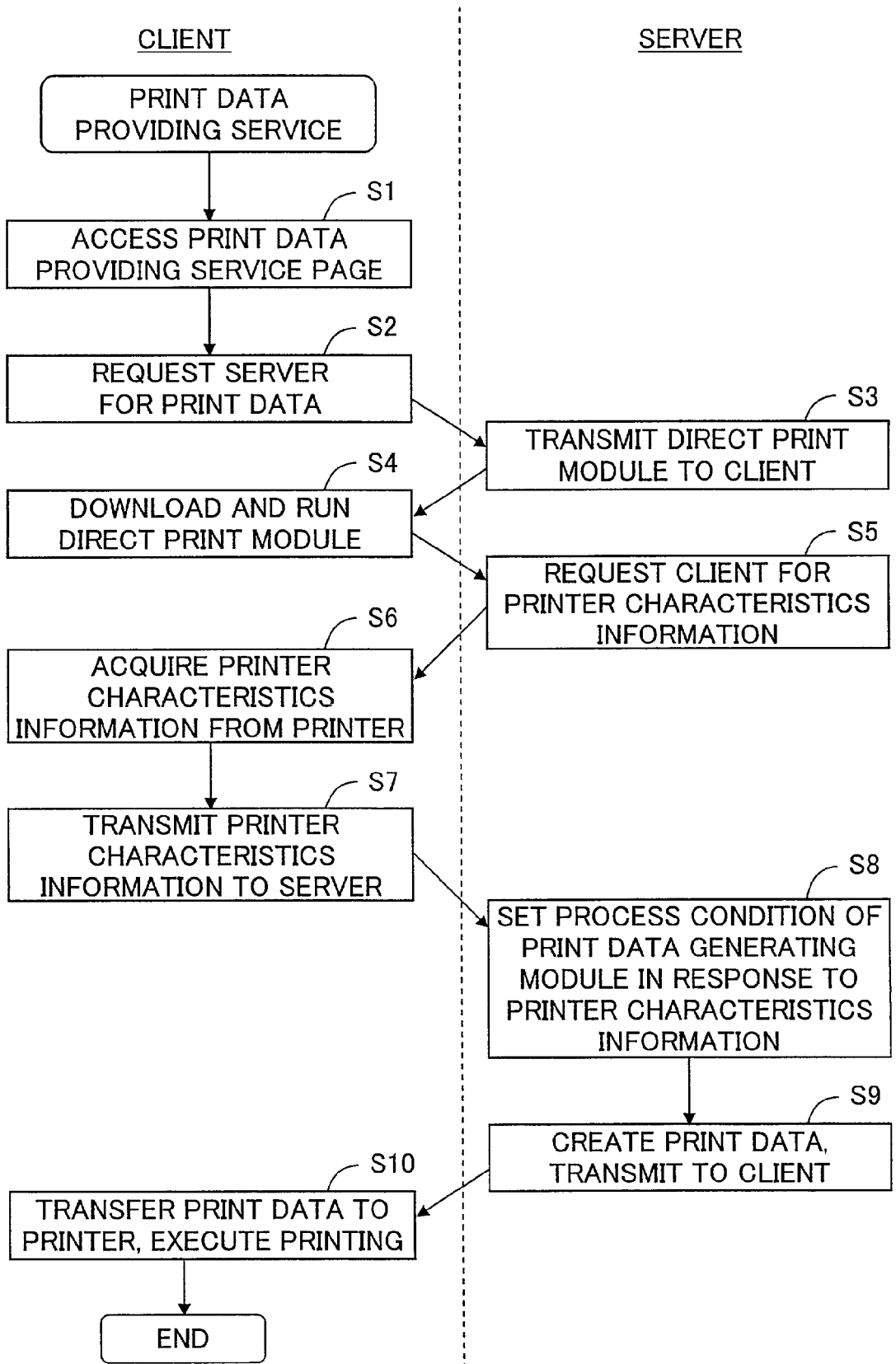
FIG. 3 is a flow chart showing one example of a procedure for receiving provision of print data from a print data providing server 120.

FIG. 3 is a flow chart showing one example of a procedure for receiving provision of print data from print data providing server 120. In Step S1, in response to a request from client 200, print data providing service page 122 is transferred from print data providing server 120 to client 200, and displayed by browser 202.

Figure 4:
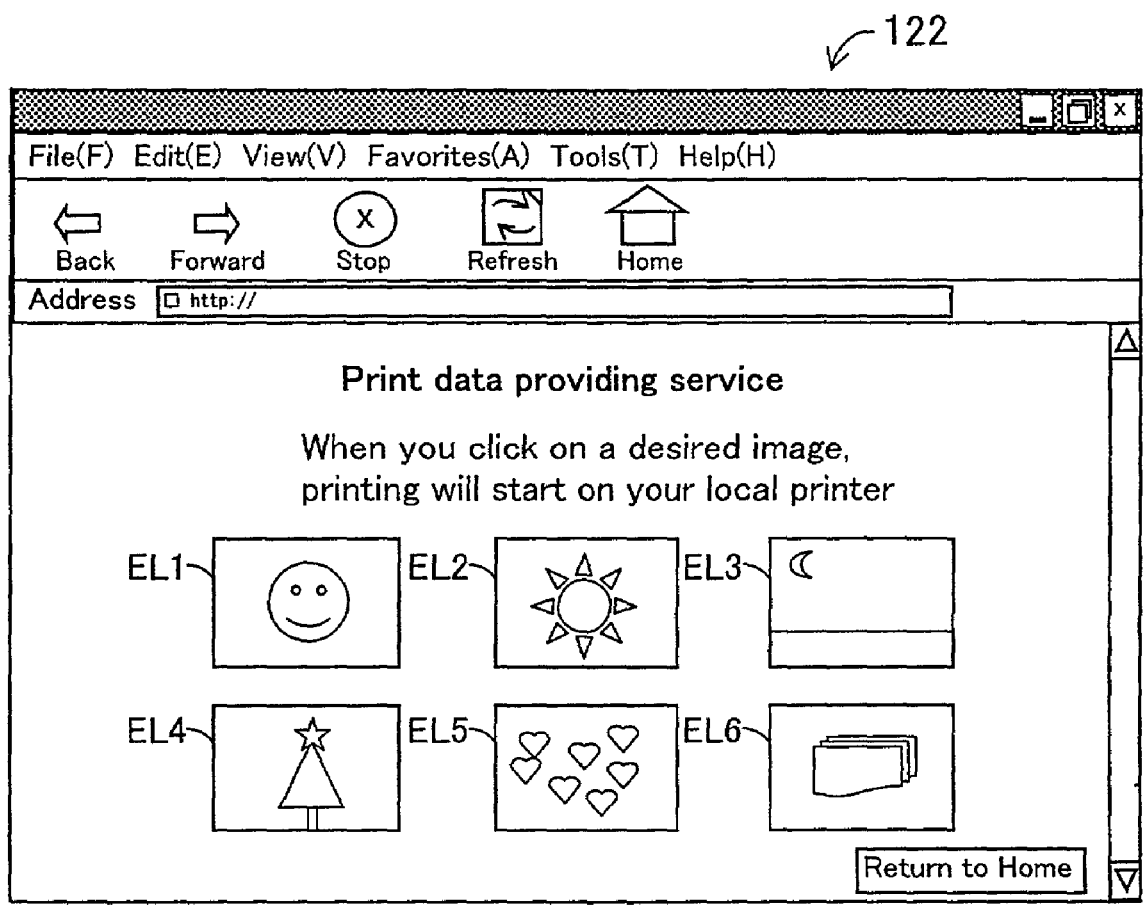
FIG. 4 is an illustration showing one example of a print data providing service page 122.

FIG. 4 is an illustration showing one example of a print data providing service page 122. On this web page 122, six elements EL1–EL6 respectively associated with six print target images are selectably displayed.

In addition, in this specification, "element" means one component placed on a web page (also simply called "page") or dialog (also called "dialog box"). As an "element", there are utilizable various components such as a button, text string, image, menu etc.

Figure 5:
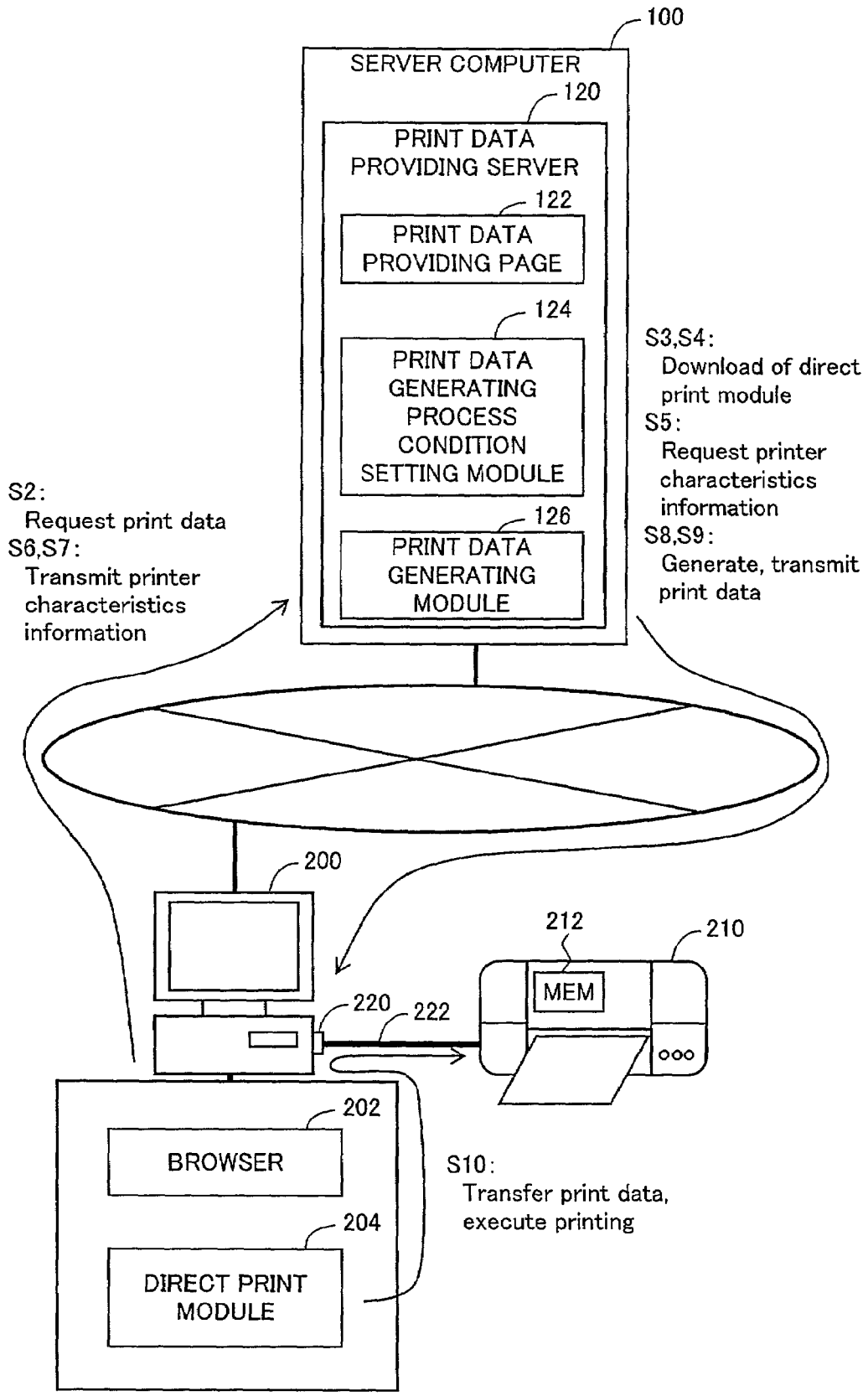
FIG. 5 is an illustration showing status after a direct print module 204 in client 200 has started up.

On the page of FIG. 4, when the user of client 200 selects any element (i.e. print target image), a request of print data in order to reproduce that image is transmitted from client 200 to server 120 (Step S2 of FIG. 3). Condition setting module 124 in server 200, upon receiving this print data request, first transfers a direct print module (described later) to client 200 (Step S3). This direct print module, when downloaded to client 200, is automatically set up and run (Step S4). FIG. 5 is an illustration showing status after a direct print module 204 in client 200 has run. Direct print module 204 has the function of, when client 200 receives provision of print data, performing communication with server 120 (more specifically, condition setting module 124) if needed, and transferring print data provided from server 120 to printer 210.

When download of direct print module 204 is completed, the condition setting module 124 of server 200 transmits a request of printer characteristic information to client 200 (Step S5). Upon receiving this printer characteristic information request, direct print module 204 acquires printer characteristic information from the memory 212 of printer 210 (Step S6).

As printer characteristic information, for example, information such as the following may be included.

(1) Printer Device Type Information:

This information indicates the printer device type (or model). This information is stored in nonvolatile memory provided to the main body of printer 210.

(2) Ink Ejection Amount Information:

This information indicates the extent to which actual ink ejection amount from the print head diverges from a standard ink ejection amount. This information originates in production errors of print heads, and is stored in nonvolatile memory provided to the main body of printer 210 or the print head.

(3) Dot Placement Accuracy Information:

This information indicates the extent to which dot placement formed by ink ejected from the print head diverges. This information also originates in production errors of print heads, and is stored in nonvolatile memory provided to the main body of printer 210 or the print head.

(4) Ink Characteristics Information:

This information is related to characteristics of ink such as type of ink contained in an ink cartridge installed in printer 210, ink density etc., and is stored in nonvolatile memory installed in the ink cartridge. Ink density information indicates the extent to which density of ink contained in an ink cartridge diverges from standard density.

(5) Print Medium Characteristics Information:

This information is related to characteristics of a print medium such as type of print medium installed in printer 210 at the current point in time. This information is stored, for example, in nonvolatile memory provided to the shaft of a print medium of roll form, or nonvolatile memory (magnetic tape etc.) provided to the front surface or back surface of a print medium of sheet form.

Printer characteristics information may include information other than the 6 kinds of information mentioned above. Printer characteristics information includes at least one kind of information relating to printing characteristics of individual printers 210.

As will be understood from the preceding description, memory 212 shown in FIG. 1, and FIG. 5 is portrayed as representative of various kinds of memory provided to printer 210.

When direct print module 204 transmits this printer characteristics information to server 100 (Step S7 of FIG. 3), the print data generation process condition setting module 124 sets a process condition of print data generating module 126 in accordance with this printer characteristics information (Step S8).

As process conditions of the print data generating process, conditions such as the following may be set.

(1) Setting of Print Resolution:

Resolution after conversion in resolution converting module 130 (FIG. 2) is set with reference to printer device type information.

(2) Selection of Color Conversion Look-up Table:

In response to at least some information of ink ejection amount information, ink type information, ink density information, and print medium type information, an appropriate color conversion look-up table (FIG. 2) is selected. In server 100, there are stored in advance a multiplicity of types of color conversion look-up tables; condition setting module 124 selects from among these one appropriate table. More specifically, for example, in the event that ink ejection amount in printer 210 is somewhat smaller than the standard amount, a color conversion look-up table 140 is selected so as to somewhat raise tone value after conversion. As a result of this, in response to print characteristics of printer 210, color conversion can be performed so as to obtain higher picture quality.

(3) Setting of Halftone Process Conditions

For example in response to printer device type information, an algorithm of a halftone process is set so as to generate halftone data which are expressed by a number of bits utilizable by printer 210. For example, in the case that printer 210 is a binary printer in which it is possible to control dot on-off only, that algorithm is selected such that 1-bit halftone data is obtained. On the other hand, in the case that printer 210 is a multiple tone printer in which it is possible to control the four types of dot formation states of large dot, medium dot, small dot, and no dot, that algorithm is selected such that 2-bit halftone data is obtained.

(4) Setting of Rasterizer

In response to dot placement accuracy information, a print mode that gives high picture quality is selected, and the process contents of rasterizer 136 are set such that printer 210 executes printing according to that print mode. The process of the rasterizer rearranges halftone data to compose raster data. Print mode and rasterizing process contents are further described later.

Setting contents of these process conditions are merely exemplary, and other various settings are utilizable.

When process conditions are set in this way, print data generating module 126 reads RGB image data stored in hard disk 150, and using each module 130, 132, 134, 136 generates print data PD (Step S9 of FIG. 3). Print data PD created in this way is transmitted by transmitting module 138 to client 200.

When client 200 receives print data provided from server 120, direct print module 204 transfers that print data PD as-is to printer 210 via parallel port 220 and cable 222 (Step S10). Printer 210 prints an image in accordance with this provided print data PD.

Also, when direct print module 204 completes printing of the print target image, print data PD is deleted from memory in client 200 (internal storage device or external storage device). Therefore, it is possible to prevent the act of transfer of this print data PD to another computer, or printing the same image any number of times using this print data PD.

In the above manner, in this embodiment, server 120 creates print data PD according to a process condition set in response to printer characteristics information indicating print characteristics of a printer 210 connected to client 200, and provides that print data PD to client 200. Therefore, print data PD appropriate to print characteristics of individual printers connected to clients can be provided to each client, and is it possible to obtain printed matter of high picture quality. Also, generation of print data in response to print characteristics of individual printers is executed on the server 120 side, so the load of the print data creating process in client 200 can be reduced.

C. Print Mode and Rasterizing Process

Figure 6:
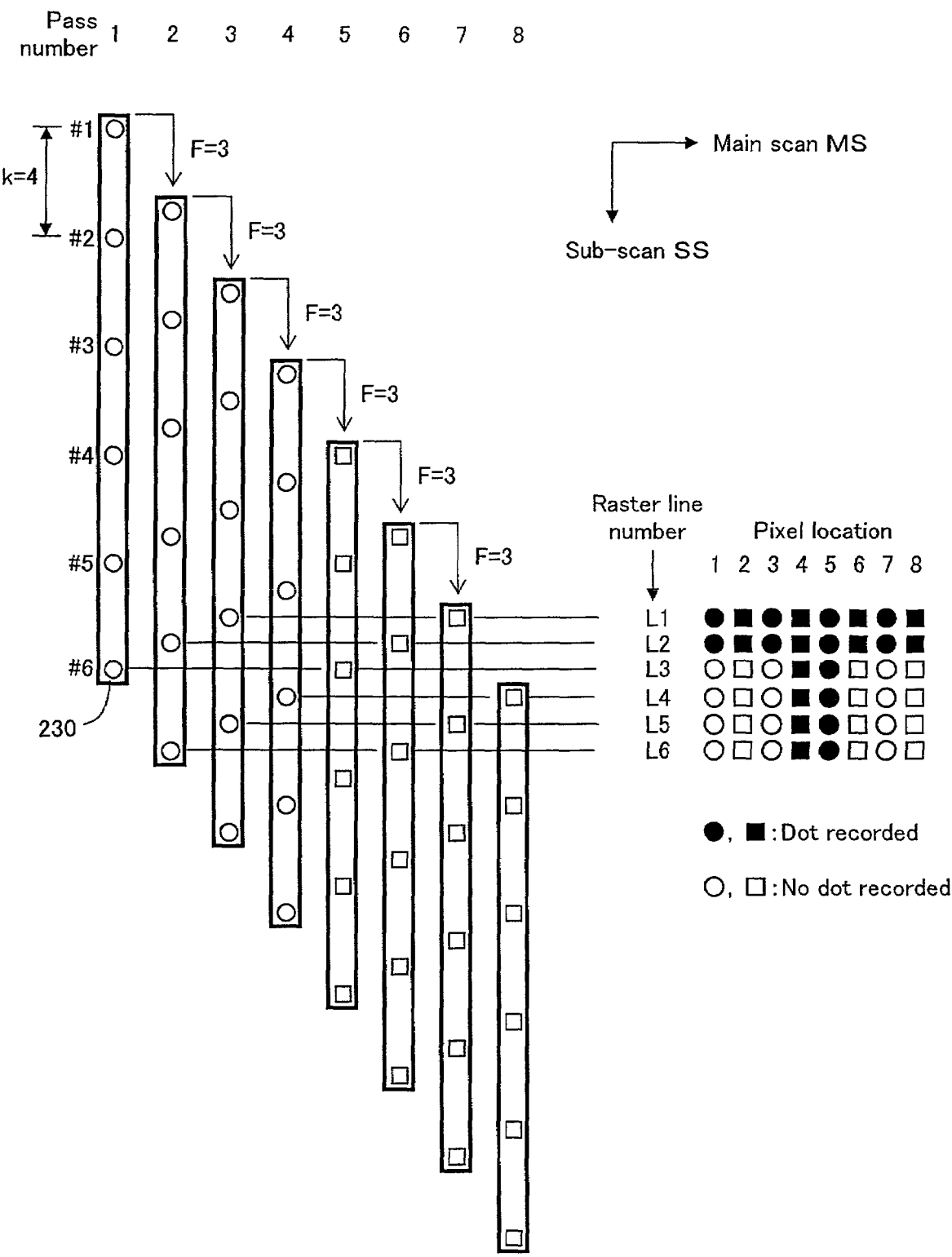
FIG. 6 is an illustration showing one example of print mode.

FIG. 6 shows one example of print mode. Here, positions of print head 230 in the sub-scan direction in the eight passes of Pass 1–Pass 8 are respectively shown. Here, "pass" means one main scan. Print head 230 has six nozzles #1–#6 (indicated by white circles) lined up in the sub-scan direction SS. The nozzle pitch k of the sub-scan direction is 4 dots. Here, the "dot" unit of nozzle pitch k means print resolution in the sub-scan direction, and this unit is also equivalent to the pitch of the raster lines (also called "main scan lines"). While print head 230 is in actual practice provided with a multiplicity of nozzle groups for a multiplicity of inks, in FIG. 6, only the nozzle group for one color is shown. Also, in an actual printer, nozzles for one color number some several tens, but for convenience in illustration here, there are assumed to be only six nozzles.

Between passes, sub-scan feed by a constant feed amount F of 3 dots is performed. In sub-scan feeding, the print paper actually moves, but for convenience in illustration in FIG. 6, the print head 230 is depicted as moving.

In each pass, while print head 230 is moving at a constant speed along the main scan direction MS, ink is ejected from each nozzle #1–#6, and ink dots are recorded onto the print medium. At the right side in FIG. 6 dot formation status on six raster lines L1–L6 is shown. Here, circles (white circles and black circles) show odd-numbered pixel locations and squares (white squares and black squares) show even-numbered pixel locations. Black circles and black squares indicate pixel locations where dots are recorded, and white circles and white squares indicate pixel locations where dots are not recorded. In Pass 1–Pass 4 only odd-numbered locations are recording targets, and in Pass 5–Pass 8 only even-numbered locations are recording targets.

This kind of print mode is prescribed by a multiplicity of print mode parameters including sub-scan feed amount F and number of nozzles used.

FIGS. 7(A) and 7(B) show the contents of a rasterizing process that creates raster data from halftone data. FIG. 7(A) shows the contents of raster data representing raster lines L1–L6 of FIG. 6. In FIG. 7(A), for simplicity, halftone data is assumed to be 1-bit data. Specifically, at pixel locations of black circles and black squares, a value indicating recording of a dot (for example a 1) is assigned to halftone data, and on the other hand at pixel locations of white circles and white squares, a value indicating non-recording of a dot (for example a 0) is assigned.

To the right side of the halftone data are shown nozzle numbers assigned to record dots at odd-numbered pixel positions and even-numbered pixel positions on each raster line. For example, dots at odd-numbered pixel positions on raster line L1 are recorded by nozzle #4, and even-numbered pixel positions are recorded by nozzle #1. This relationship is the same as the relationship in FIG. 6.

FIG. 7(B) shows raster data for use in Pass 1–Pass 8. In Pass 1 in FIG. 6, odd-numbered pixel positions on raster line L3 are recorded by nozzle #6. Accordingly, in raster data for use in Pass 1, data indicating dot recording status of odd-numbered pixel positions of raster line L3 is created as data for use by nozzle #6. Here, it is assumed that no dots whatsoever are formed on raster lines other than raster lines L1–L6.

Similarly, in Pass 2 in FIG. 6, odd-numbered pixel positions on raster line L6 are recorded by nozzle #6. Also, odd-numbered pixel positions on raster line L2 are recorded by nozzle #5. Accordingly, in raster data for use in Pass 2, data indicating dot recording status of odd-numbered pixel positions of raster line L6 is created as data for use by nozzle

6, and data indicating dot recording status of odd-numbered pixel positions of raster line L2 is created as data for use by nozzle #5.

In this way, rasterizer 136 (FIG. 2), in response to print mode, creates raster data indicating dot recording status in each mode, from halftone data. Print data PD includes this raster data and a sub-scan feed amount F after each pass.

Figure 8:
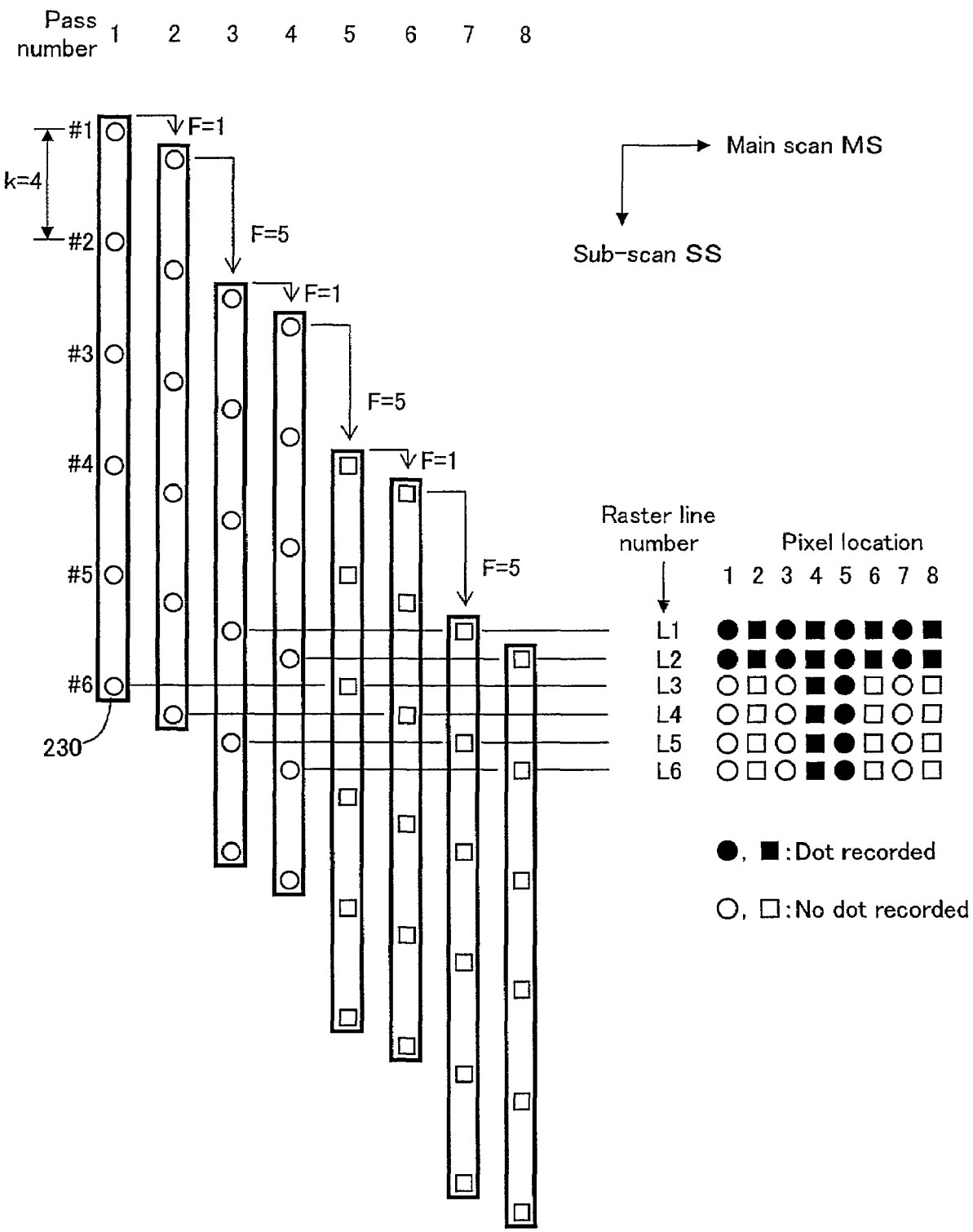
FIG. 8 is an illustration showing another example of print mode.

FIG. 8 shows another example of print mode. In this print mode, sub-scan feed amount F repeats 1 dot and 5 dots, but in other respects is the same as the example shown in FIG. 6. Also, a print mode in which sub-scan feed amount F is constant as in FIG. 6 is called "constant feed", and a print mode in which a multiplicity of values can be used as sub-scan feed amount F as in FIG. 8 is called "variable feed".

In the print modes shown in FIG. 6 and FIG. 8, different raster lines are targeted for dot recording in each pass. Specifically, in the print mode shown in FIG. 6, raster lines L2, L6 are targeted for dot recording in Pass 2, whereas in the print mode shown in FIG. 8, raster line L4 is targeted for dot recording in Pass 2. Accordingly, raster data for use in Pass 2 is different for the print mode shown in FIG. 6 and the print mode shown in FIG. 8.

In the above manner, in different print modes, raster data representing recording status of dots is mutually different. Therefore, rasterizer 136 (FIG. 2), depending on the print mode set by the print data generation process condition setting module 124, alters the method of rearrangement from halftone data to raster data. For example, condition setting module 124, in response to dot placement accuracy information (information indication deviation of dot position) of printer 210, selects, from the multiplicity of print mode pre-registered in condition setting module 124, one print mode that can achieve high picture quality, and sets the rasterizer 136 to that print mode. By means of this arrangement, print modes appropriate to individual printers can be used, and as a result high quality printing can be executed.

E. MODIFICATION EXAMPLES

E1. Modification Example 1

In the embodiment hereinabove, print data generating module 126 generated print data PD from RGB multiple tone image data, but instead of this, print data PD readied in advance could be corrected according to a print data generating process condition set in response to printer characteristics information. That is, print data generating module 126 could be constructed as a module having a function of generating print data according to a print data generating process condition set in response to printer characteristics information.

E2. Modification Example 2

In the embodiment hereinabove, printer 201 is connected to client 200 via an external interface 220, but instead printer 210 may be provided within client 200. In this case, transfer of print data from client 200 to printer 210 is carried out within client 200.

E3. Modification Example 3

In the embodiment hereinabove, as described in FIG. 3, when a request for print data is received, server 100 transferred a direct print module 204 to client 200, but it is not always necessarily to transfer a direct print module 204 to client 200. For example, if in print data provided by server 100 there is included a control command indicating that that print data should be transferred to printer 210, it is possible to omit the direct print module 204.

E4. Modification Example 4

In the embodiment hereinabove, an ink-jet printer is used as printer 210, but instead a printer other than an ink-jet printer may be used as printer 210. It should be pointed out that with ink-jet printers, there is a tendency for print characteristics, such as ink eject amount and dot formation location etc. to deviate by individual printer due to production errors of print heads (especially production errors of nozzle portions). Therefore, in the case that an ink-jet printer is used, it is expected that the effect of improving picture quality by generating print data in accordance with printer characteristics data representing print characteristics of individual printers will be more appreciable.

E5. Modification Example 5

In the embodiment hereinabove, some of the functions of the client 200 could instead be executed by the server 100. Conversely, some of the functions of the server 100 could instead be executed by the client 200.

E6. Modification Example 6

In the embodiment hereinabove, the print target image is a single independent image, but, as the print target image, a combined image combining a multiplicity of images could be made the print target image. A combined image could be created, for example, by selecting and editing a multiplicity of source images like those shown in FIG. 4.

E7. Modification Example 7

The client in the present invention is not limited to a so-called computer narrowly defined; any device or machine that includes a CPU, and that is connected to a network capable of two-way communication, can function as a client. The network may be a wireless network, or one utilizing power lines. For example, a household television, air conditioner or other electronic product may serve as a client. Specifically, where a television is connected to a video player equipped with a hard disk, the television may function as the client to execute defect countermeasures of the video player. Defect countermeasures may also be executed as regards the client per se. As will be understood from this example, "computer" in this specification has a broad meaning that encompasses various devices and machines that include a CPU.

While the invention has been described in detail and illustrated hereinabove, these are given as examples, and is not limited to these, the concept and scope of the invention being limited only by the accompanying claims.

What is claimed is:

1. A method of, with the aid of a server system, providing print data for performing printing by a specific printer connected to a client device, through a network to the client device, comprising the steps of:
   (a) providing web page information containing an element for selecting a print target image to the client device for display on a display screen of the client device, (b) receiving, from the client device through the network, information indicating an element selected on the display screen of the client device, (c) transmitting to the client device a request for printer characteristics information associated with print characteristics of the specific printer connected to the client device;

(d) receiving the printer characteristics information from the client device through the network;

(e) setting, in accordance with the printer characteristics information, a print data generating process condition for generating the print data of an image corresponding to the selected element;

(f) generating, in accordance with the print data generating process condition, print data for use by the specific printer;

(g) providing the print data for use by the specific printer to the client device; and (h) preparing multiple tone image data representing the print target image, wherein the step of generating print data for use by the specific printer comprises:

(f1) a color conversion step for converting the multiple tone image data from data of a first color system to data of a second color system using a color conversion look-up table;

(f2) a halftone process step for halftoning multiple tone image data of the second color system to generate halftone data; and (f3) a rasterizing step for reassembling the halftone data into print data that includes raster data indicating dot formation status in each main scan executed in the specific printer and sub-scan feed amount executed in intervals between main scans, and wherein the step of setting print data generating condition includes a step of setting a process condition for at least one step of the steps (f1)–(f3) according to the printer characteristics information.

2. A method according to claim 1, wherein the specific printer is an-ink jet printer that forms dots by ejecting ink from a print head, and wherein the printer characteristics information includes at least one of:

(i) printer device type information indicating a device type of the ink-jet printer;

(ii) ink ejection amount information indicating an ejection amount of ink from the print head;

(iii) dot placement information indicating error in formation locations of dots by the print head;

(iv) ink characteristics information relating to characteristics of ink used by the ink-jet printer; and (v) print medium characteristics information relating to characteristics of a print medium used by the ink-jet printer.

3. A method according to claim 1 wherein the step (c) includes a step of transferring a direct print module to the client device, the direct print module transferring the print data provided to the client device to the specific printer in the step (g).

4. A server system connected to a client device through a network and used for providing print data for performing printing to a specific printer connected to the client device, the server system comprising:

a storage device for storing a web page that includes a print data request-use element for inputting a request of print data used for reproducing a print target image;

a process condition setting section that, upon receiving a print data request issued by the client device in response to selection of the print data request-use element by a user of the client device on the web page, transmits to the client device a request for printer characteristics information related to print characteristics of the specific printer; and upon the receiving the printer characteristics information from the client device, sets a print data generating process condition for generating the print data in accordance with the printer characteristics information; and a print data generating section for generating print data for use by the specific printer in accordance with the printer characteristics information, and providing the print data to the client device through the network, wherein the storage device further stores multiple tone image data representing the print target image, the print data generating portion comprises:

a color converting section for converting the multiple tone image data from data of a first color system to data of a second color system using a color conversion look-up table;

a halftone process section for halftoning multiple tone image data of the second color system to generate halftone data; and a rasterizer for reassembling the halftone data into print data that includes raster data indicating dot formation status in each main scan executed in the specific printer and sub-scan feed amount executed in intervals between main scans, and wherein the process condition setting section in accordance with the printer information sets a process condition in at least one of the color converting section, the halftone process section, and the rasterizer.

5. A server system according to claim 4, wherein the specific printer is an-ink jet printer that forms dots by ejecting ink from a print head, and wherein the printer characteristics information includes at least one of:

(i) printer device type information indicating a device type of the ink-jet printer;

(ii) ink ejection amount information indicating an ejection amount of ink from the print head;

(iii) dot placement information indicating error in formation locations of dots by the print head;

(iv) ink characteristics information relating to characteristics of ink used by the ink-jet printer; and (v) print medium characteristics information relating to characteristics of a print medium used by the ink-jet printer.

6. A server system according to claim 4, wherein the storage device further stores a direct print module for executing transfer of print data from the client device to the specific printer, and wherein the server system transfers the direct print module to the client device, and causes the direct print module to execute transfer to the specific printer of the print data provided to the client device.

7. A program product for executing a process for providing print data for performing printing to a specific printer connected to a client device, comprising a computer-readable medium, and a computer program stored on the computer-readable medium, the computer program being to be executed by a server system connected to a client device through a network, wherein the computer program includes:

a first program for causing the server system to implement the functions of upon receiving a print data request issued by the client device in response to selection of a print data request-use element by a user of the client device on a web page that includes the print data request-use element for inputting a request of print data for a print target image, transmitting to the client device a request for printer characteristics information related to print characteristics of the specific printer; and upon the receiving the printer characteristics information from the client device, setting a print data generating process condition for generating the print data in accordance with the printer characteristics information; and a second program for causing the server system to implement the functions of generating, in accordance with the printer characteristics information, print data for use by the specific printer, and providing the data to the client device through the network, wherein the server system further stores multiple tone data representing the print target image, the second program includes:
- a program for causing the server system to implement a color converting function for converting the multiple tone image data from data of a first color system to data of a second color system using a color conversion look-up table;
- a program for causing the server system to implement a halftone process function for halftoning multiple tone image data of the second color system to generate halftone data, and
- a program for causing the server system to implement a rasterizing function for reassembling the halftone data into print data that includes raster data indicating dot formation status in each main scan executed in the specific printer and sub-scan feed amount executed in intervals between main scans, and wherein the first program sets a process condition in at least one function selected from the color converting function, the halftone process function and the rasterizing function.

8. A program product according to claim 7, wherein the specific printer is an-ink jet printer that forms dots by ejecting ink from a print head, and wherein the printer characteristics information includes at least one of:
(i) printer device type information indicating a device type of the ink-jet printer;
(ii) ink ejection amount information indicating an ejection amount of ink from the print head;
(iii) dot placement information indicating error in formation locations of dots by the print head;
(iv) ink characteristics information relating to characteristics of ink used by the ink-jet printer; and
(v) print medium characteristics information relating to characteristics of a print medium used by the ink-jet printer.

9. A program product according to claim 7, wherein the computer program includes a direct print module for executing transfer of print data from the client device to the specific printer, and wherein the computer program executes transfer of the direct print module to the client device, and causes the direct print module to transfer to the specific printer the print data provided to the client device.

* * * * *